Dec. 16, 1930.  W. T. RHODES  1,785,284
SURVEYING INSTRUMENT
Filed Oct. 24, 1927
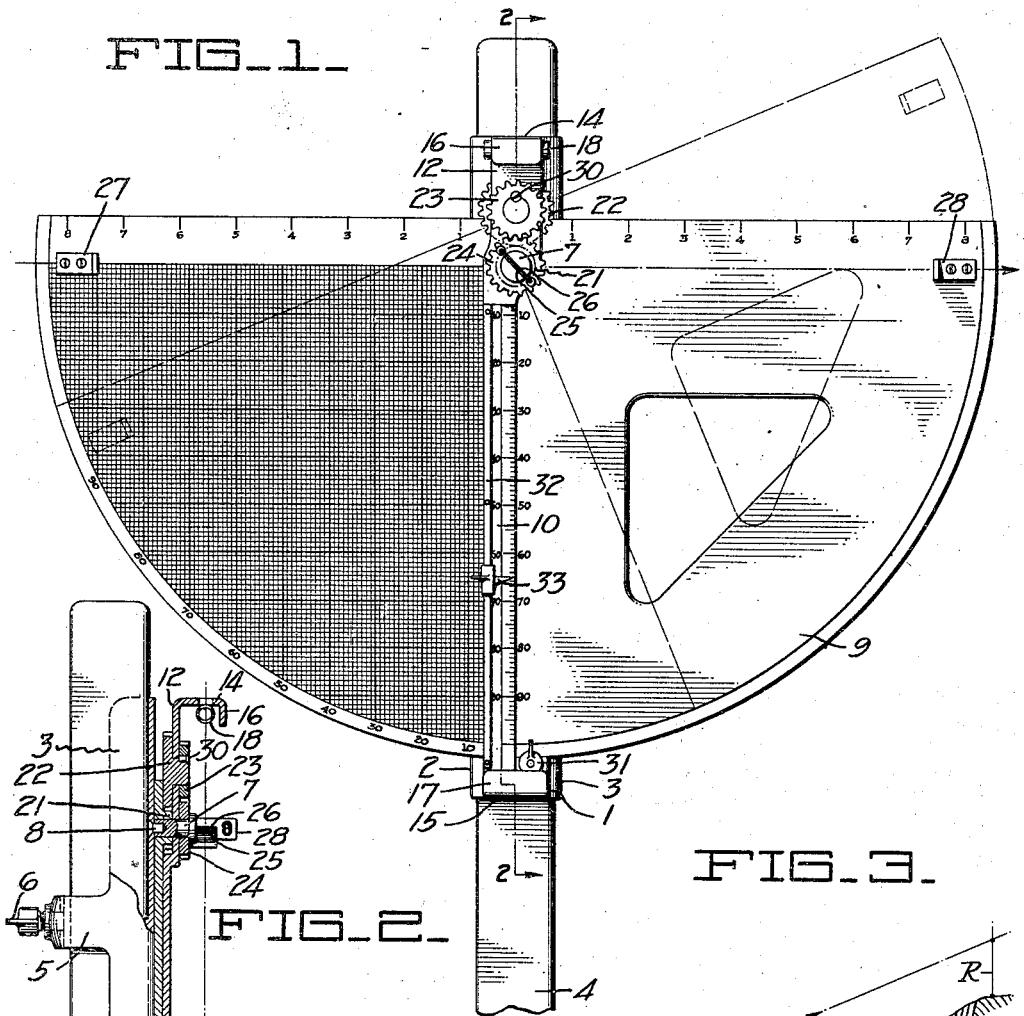
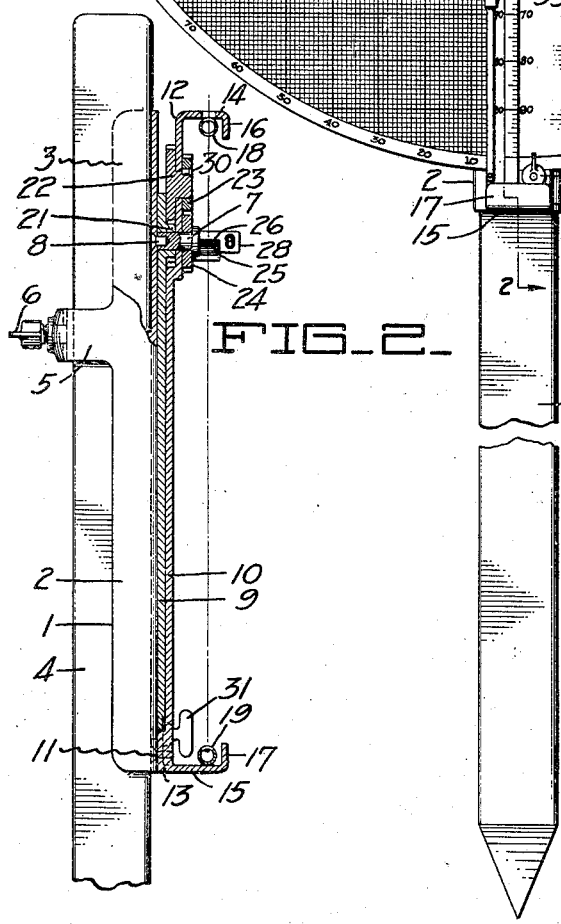
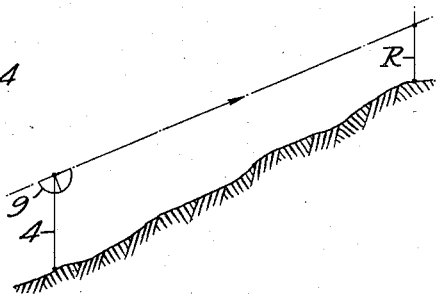
INVENTOR
William T. Rhodes
BY
White, Prost & Fryer
his ATTORNEYS Patented Dec. 16, 1930

1,785,284

UNITED STATES PATENT OFFICE

WILLIAM T. RHODES, OF MARIPOSA, CALIFORNIA

SURVEYING INSTRUMENT

Application filed October 24, 1927. Serial No. 228,289.

In my application entitled "Surveying instrument", Serial Number 121,948, filed July 12, 1926, certain clearly indicated parts of the subject matter thereof have been disclosed.

My invention relates to surveying instruments in general and particularly to that class of instruments in which the instruments must first be leveled and the axis of its quadrant located with respect to the earth before any angle measurements or rod readings are made. In the use of the instruments now on the market this setting up of the instrument consumes a great amount of time. Most of them are mounted on tripods and in setting up an instrument with the use of a tripod the location of the axis of the instrument with respect to the earth, both vertical and horizontal is unknown. A plumb line is usually used for determining its horizontal location and its vertical distance from the ground is determined either by indicia on the plumb line or on a separate rod or tape. The instrument is then leveled and finally an angle measurement is made. These four distinct steps have to be gone through with each time that a new angle measurement or rod reading is made. It will therefore be seen that a great amount of time is so wasted and the surveyor's work becomes very tedious, particularly so when a number of turning points have to be used.

In general it is the object of my invention to consolidate the four steps required in the customary angle determination, into a single step.

Another object of my invention is to consolidate the two steps of leveling the instrument and making an angle measurement by so constructing an instrument that its level may always be observed in the line of sight of the instrument.

Another object of my invention is to mount my instrument on a pointed staff at a known distance above the pointed end of the staff and with the axis of its quadrant intersecting the axis of the staff, thereby definitely locating the axis of the instrument with respect to the earth as soon as the instrument has been leveled.

Another object of my invention is to form a triangle on the quadrant or sector of my instrument, similar to the triangle which is to be determined, concurrently with the measurement of one of the angles of the triangle to be determined.

The invention possesses other advantageous features, some of which with the foregoing will be set forth at length in the following description, where I shall outline in full that form of the invention, which I have selected for illustration in the drawings accompanying and forming part of the present specification. In said drawings I have shown one form of the device embodying my invention, but it is to be understood that I do not limit myself to such form, since the invention as set forth in the claims may be embodied in a plurality of other forms.

Referring to the drawings:

Figure 1 is a side elevational view of my device.

Figure 2 is a vertical sectional view of my device taken on the line 2—2 of Fig. 1 and looking in the direction as indicated by the arrows.

Figure 3 is a diagrammatic representation showing one manner in which my device may be used.

My device comprises a support 1, the sides 2 and 3 of which are turned back at right angles to form a channel in which a staff 4 may be accommodated. Extending from the sides 2 and 3 is a clamping member 5 provided with a set screw 6 which is adapted to engage the staff 4.

A pin 7 is secured to the support 1 by means of a screw 8. Journaled on the pin 7 is a semi-circular disc or sector 9. A strap 10 overlies the sector 9 and is non-rotatably secured to the support 1 by means of a screw 11 and by engagement with the pin 7. The strap 10 is parallel with the support 1 and has its upper and lower ends 12 and 13 turned outwardly as at 14 and 15 and then inwardly to form guards 16 and 17. My device is so constructed that the sector 9 is free to rotate between the support 1 and the strap 10. Spirit levels 18 and 19 are mounted on the inner faces of the inwardly projecting portions 14 and 15 and are protected by the guards 16 and 17. It will be noted that these levels are mounted in line with the axes of the support 1 and the staff 4.

Non-rotatably secured to or integral with the sector 9 is a small gear wheel 21. This gear wheel 21 meshes with the teeth of the larger one of a pair of idler gear wheels 22 and 23, journaled in the upper end of the strap. The idlers 22 and 23 are non-rotatably secured with respect to each other by means of a screw 30. A fourth gear 24 is journaled on the pin 7 and meshes with the teeth of the gear 23. The gear ratio between the gears 21 and 22 is one-half, so that the rotation of the sector 9 through any given angle will cause the gear 22 to rotate through half of that angle. The gear ratio between the gears 23 and 24 is one, so that the rotation of the sector 9 through any given angle causes the gear 24 to rotate through half that angle. A pair of mirrors 25 and 26, faced back to back, straddle the head of the pin 7, and are non-rotatably mounted on the gear 24. These mirrors which may conveniently be prisms therefore rotate through half the angles covered by the sector 9. Diametrically opposed sights 27 and 28 are mounted on the sector 9 on a diameter passing through the axis of the pin 7. As may be seen from an inspection of Fig. 1, when the axis of the support 1 is perpendicular with the line of sight through the sights 27 and 28, the mirrors 25 and 26 make an angle of 45° with both the line of sight and the axis of the support 1. It will be noted from Fig. 2 that a plane drawn through the peep holes of the sights 27 and 28 and parallel with the face of the sector 9 is very slightly displaced from a parallel plane passing through the levels 18 and 19 and mirrors 25 and 26. If the sector 9 is rotated the mirrors 25 and 26 rotate through half of the angle covered by the sector 9 and therefore the reflections of one of the levels 18 and 19 is always substantially in the line of sight between the sights 27 and 28. The level whose reflection is seen is dependent upon the direction of sight. When looking through sight 27 toward sight 28 the reflection of level 18 is observed while when a sight is made from sight 28 toward sight 27, level 17 is observed.

A scale is marked off on the strap 10. The sector may be cross-sectioned as shown in Fig. 1 and carries suitable indicia by which any point on its face may be located with respect to its axes. The diametrical edge of the sector 9 is also conveniently marked off from right to left as shown in Fig. 1. The latter scale being used in conjunction with the chain measurements made to determine the hypotenuse of the triangle being determined.

A thumb screw 31 is screwed to the support 1 and can be made to engage the sector 9 to hold the sector in any desired position. A rod 32 may be secured to the strap 10 over the sector 9 and carries a sliding pointer 33.

The operation of my device is as follows: The support 1 is secured to the preferably pointed staff 4 at a known distance from the end of the staff. The staff is then placed in the ground at a point from which the measurements are to be or have been taken. A rod man holds the rod R (Fig. 3) in a vertical position at some distance off and a convenient point on this rod is sighted through the sights 27 and 28. Concurrently with sighting this point on the rod R the instrument can be maintained in a level position, due to the fact that a spirit level may always be observed without taking the eye from the sights. In sighting the desired point on the rod R, the sector 9 has been rotated through an angle corresponding to the base angle of the triangle which is to be determined. The sector is then clamped in this position by means of the thumb screw 31. It will be noted that the strap 10 forms a hypotenuse of a triangle whose horizontal and vertical sides are formed by a pair of right angularly disposed lines marked on the sector 9. The base angle of this triangle is equal to the base angle of the triangle to be determined. This triangle on the sector 9 is therefore similar to the triangle to be determined and if one leg and the hypotenuse of one is known then the unknown elements may be scaled from the sector 9 or directly read off.

Another method of using my device is to place the staff at any point in which the measurement is to be taken, to then rotate the sector 9 until the sights are directed to a point falling well within the rod R. The sector 9 is then turned to such a position that the hypotenuse and vertical legs of the triangle on the instrument may be set at a digit or a convenient fraction thereof. The rod man is then told to raise or lower his rod until some convenient point is in line with the sights. The determination of the triangle is otherwise just the same as above described.

My device does not necessarily need to be mounted on a staff but may be held by hand while the determination is being made.

It will be seen that by a construction as above described, the four distinct steps executed in the determination of any one angle have been consolidated into a single step, thereby greatly reducing the time required for such a determination. The vertical distance of the axis of the instrument above the ground is constant, the horizontal location of the axis of the instrument is known because when the instrument is level it is known that this axis lies on a vertical line passing through the point of contact of the staff with the ground; the acts of sighting and of leveling are done concurrently and by clamping the sector in the position in which the desired angle has been sighted, a triangle has been formed by the instrument, the base angle of which, is equal to the base angle of the triangle to be determined and is therefore similar to that triangle. The hypotenuse of the triangle to be determined is obtained by chain measurements and the hypotenuse being determined the other two sides can be read off directly from the instrument.

I claim:

1. In a surveying instrument of the class described; a support; a sector pivotally mounted on said support; and means including a pair of sights carried by said sector; a gear driven mirror mounted on the axis of said sector; a level; and a staff for concurrently locating the axis of the sector with respect to the earth, measuring the vertical angle of a triangle to be determined, leveling said support and forming a triangle on the sector similar to the triangle to be determined.

2. In a surveying instrument of the class described; a support; a sector pivotally mounted on said support; a level carried at each end of the support; and means including a pair of diametrically opposed sights; a plurality of gear driven mirrors mounted on the axis of said sector and a staff for concurrently locating the axis of the sector with respect to the earth, measuring the vertical angle of a triangle to be determined, leveling said support and forming a triangle on the sector similar to the triangle to be determined.

3. In a surveying instrument of the class described, a support, a cross-sectioned sector rotatably mounted on said support and provided with a pair of sights in alinement with its axis, a scale secured to said support over said sector, a rotatable reflecting surface mounted on the axis of said sector, a leveling bubble carried by said support and means associated with said sector, and said reflecting surface for automatically rotating said reflecting surface thru half the angle traversed by said sector.

4. In a surveying instrument of the class described, a support, staff means for locating said support at a predetermined distance above a surface, a sector rotatably mounted at an axis of the support, a level carried by said support, sights on said sector, and means between the sights enabling an operator to observe the level while looking through said sights to maintain the staff means in a desired angular position relative to said surface.

5. In a surveying instrument of the class described, a support, staff means for locating said support at a predetermined distance above a surface, a sector rotatably mounted at an axis of the support, a level carried by said support, sights on said sector, a mirror cooperatively mounted with respect to the level, and means for rotating said mirror during rotation of the sector to enable an operator looking through the sights to maintain the staff means in a desired angular position relative to the said surface.

6. In a surveying instrument of the class described, a support, staff means for locating said support at a predetermined distance above a surface, a sector rotatably mounted at an axis of the support, a level carried by said support, sights on said sector, a mirror cooperatively mounted with respect to the level, and means for rotating said mirror through half the rotation distance of the sector so that an operator can observe the level to maintain the staff means in a desired angular position relative to said surface while looking through the sights.

7. A surveying instrument comprising a staff for positioning on a surface, a graduated sector mounted for movement with said staff, sighting means rotatably mounted with respect to the staff, means cooperably associated with the sighting means for indicating on the sector angular rotation of the sighting means, level means cooperatively mounted with respect to the staff, and means for viewing said level means to enable an operator while sighting through the sighting means to maintain the staff in a predetermined position relative to the surface.

8. A surveying instrument comprising a staff for positioning on a surface, a graduated sector mounted on an axis of said staff, sighting means rotatably mounted with respect to the staff, means cooperably associated with the sighting means for indicating on the sector angular rotation of the sighting means, level means cooperatively mounted on the said axis of the staff, and means for viewing said level means to enable an operator while sighting through the sighting means to maintain the axis of the staff in a predetermined angular position relative to the surface.

9. A surveying instrument comprising a graduated sector, sighting means mounted to be moved to sight a distant object, means cooperatively associated with the sighting means and the sector for indicating on the sector angular movement of the sighting means from a predetermined position, a supporting means for supporting said sector at a substantially predetermined distance above a surface, and means enabling an operator to maintain said supporting means level while sighting through the sights.

10. A surveying instrument comprising a graduated sector, sighting means mounted to be moved to sight a distant object, means cooperatively associated with the sighting means and the sector for indicating on the sector angular movement of the sighting means from a predetermined position, a supporting means for supporting said sector at a substantially predetermined distance above a surface, level means cooperatively associated with said supporting means for determining the level position of the support, and means enabling said operator to simultaneously observe said level means and sight through the sighting means.

In testimony whereof, I have hereunto set my hand.

WILLIAM T. RHODES.